United States Patent [19]
Daum et al.

[11] 3,830,696
[45] Aug. 20, 1974

[54] PROCESS FOR THE PREPARATION OF 5-HYDROXY-L-TRYPTOPHAN

[75] Inventors: Joachim Daum; Klaus Kieslich, both of Berlin, Germany

[73] Assignee: Schering Aktiengesellschaft, Berlin and Bergkamen, Germany

[22] Filed: Oct. 3, 1972

[21] Appl. No.: 294,528

[30] Foreign Application Priority Data
Oct. 6, 1971  Germany............................ 2150535

[52] U.S. Cl........................ 195/29, 195/28, 195/30
[51] Int. Cl.............................................. C12d 1/00
[58] Field of Search...................... 195/28 R, 29, 30

[56] References Cited
OTHER PUBLICATIONS
Mitoma et al. Nature, Vol. 175, pages 994–995; 1955.

*Primary Examiner*—A. Louis Monacell
*Assistant Examiner*—Robert J. Warden
*Attorney, Agent, or Firm*—Millen, Raptes & White

[57] ABSTRACT

A process for the preparation of 5-hydroxy-L-tryptophan, comprising microbiologically hydroxylating a substrate selected from the group consisting of L-tryptophan, D,L-tryptophan and ω-N-acyl-L-tryptophan with a human-nonpathogenic microorganism selected from the group consisting of the families micrococcaceae, pseudomonadaceae, corynebacteriaceae, and bacillaceae, especially the specie Bacillus subtilis ATCC No. 21733.

11 Claims, No Drawings

PROCESS FOR THE PREPARATION OF 5-HYDROXY-L-TRYPTOPHAN

BACKGROUND OF THE INVENTION

This invention relates to a process for the preparation of 5-hydroxy-L-tryptophan by the microbiological hydroxylation of L-tryptophan, D,L-tryptophan and ω-N-acyl-L-tryptophan.

5-Hydroxy-L-tryptophan is believed to be the transport form of 5-hydroxytryptamine (serotonin). The latter is produced from the amino acid by enzymatic decarboxylation. Serotonin is an important biogenic amine and plays a significant part as a transmitter substance in the central nervous system; see *Angew. Chemie* 83:53–69 (1971) and *Pharmaz. Ztg.* 115:921–925 (1970). A serotonin deficiency can be overcome by supplying 5-hydroxy-L-tryptophan as described in *Swiss Medical Weekly* 100:357 (1970). Because of this relatively recently discovered importance of 5-hydroxy-L-tryptophan, a need has arisen for a commercially feasible process for the preparation of this substance.

It is known from *Arch. Biochem. Biophys.* 63:122–130 (1956) that 5-hydroxy-L-tryptophan is formed in trace amounts during the biosynthesis of violacein, a purple pigment dye, and a characteristic metabolic product of *Chromobacterium violaceum*. Mitoma et al. reported in *Nature* 175:994–995 (1955) that during the fermentation of L-tryptophan with *Chromobacterium violaceum* (ATCC 553), they obtained a yield of 3.6 percent of theory in 5-hydroxyindole compounds, the predominant product being 5-hydroxy-L-tryptophan. However, the isolation of pure 5-hydroxy-L-tryptophan was unsuccessful. The use of *Chromobacterium violaceum* is furthermore hazardous because of the pathogenic properties of this organism.

OBJECTS OF THE INVENTION

Accordingly, it is a general object of this invention to provide a process for the preparation of 5-hydroxy-L-tryptophan.

Another object of this invention is to provide a microbiological process for the preparation of 5-hydroxy-L-tryptophan, using microorganisms which are non-pathogenic to humans.

A further object of this invention is to provide a microbiological process for the preparation of 5-hydroxy-L-tryptophan which can be readily isolated as a reaction product.

An additional object of this invention is to provide an enzymatic process for the in vitro preparation of 5-hydroxy-L-tryptophan.

A more particular object of this invention is to provide a process for the preparation of 5-hydroxy-L-tryptophan using a new strain of bacillus.

Other objects and advantages of this invention will become apparent to those skilled in the art upon further study of the specification and appended claims.

SUMMARY OF THE INVENTION

The above and other objects are attained in one aspect of the present invention by providing a process for the preparation of 5-hydroxy-L-tryptophan which comprises micro-biologically hydroxylating L-tryptophan, ω-N-acyl-L-tryptophan, or mixtures thereof, with an organism selected from the group consisting of Micrococcus, Pseudomonas, Corynebacterium, Enterobacter and Bacillus. Either the culture, fermentation broth, or enzymes produced therein, or any fraction thereof possessing hydroxylating activity can be employed for the hydroxylation step. Accordingly, when it is stated herein that the hydroxylation is conducted with the microorganism, all of such hydroxylating media are intended to be embraced thereby.

DETAILED DISCUSSION 6.8.

It has now been found that gram-positive unicellular bacteria, in particular, the microorganisms which are not human-pathogenic, of the families Micrococcus, Pseudomonas, Corynebacterium, Enterobacter and Bacillus are capable of converting L-tryptophan and ω-N-acetyl-L-tryptophan into 5-hydroxy-L-tryptophan in good yields.

Of these families, a new strain of bacillus has proven to be especially advantageous for the microbiological hydroxylation. This novel bacillus strain has been filed with the American Type Culture Collection and has been designated Bacillus subtilis ATCC 21733.

The properties of this bacillus strain are as follows:
1. Rods.
2. Mortality: None
3. Gram stain: labile to negative.
4. Spore shape: large, angular, occurrence of shadow forms.
5. Growth on bouillon-agar plates: small colonies after 1–2 days of incubation at 30°C, exhibiting a somewhat larger area at an incubating temperature of 37°C. Convex yellowish-white colonies of a rough upper surface, with a rounded and smooth underside. Edges of colony finely lobed, with colony centers partially smooth, partially folded.
6. Growth on special agar plates for Bacillus subtilis (glucose, peptone, meat extract): colonies of normal size after 1–2 days of incubation at 30°C or 37°C, flat, and of a yellowish to brownish color, surface creased like a skin, with a dark center, and coarsely lobed edges. Colony undersides are rounded and folded.
7. Growth on corn steep liquor/glucose/yeast extract plates: small colonies after 1–2 days of incubation at 30°C or 37°C, flat, and of a light to white color, surface rough and lobed with a smooth or folded center, edges finely lobed. Underside of colonies rounded and creased.
8. Growth on mannitol — tilted agar tubes: weak.
9. Growth on lactose — tilted agar tubes: normal.
10. Growth on D-glucose — tilted agar tubes: normal.
11. Growth on $KNO_2$ — tilted agar tubes: weak to normal.
12. Growth on Voges-Proskauer — tilted agar tubes: normal.
13. Growth on iron (II) — tilted agar tubes: normal.
14. No gelatin liquefaction was observed (random culture, high gelatin layer).
15. Colonies grown on Bacillus subtilis special agar assume a brownish-pink color after standing for 3 to 5 days and spread an increasingly pungent odor.
16. Biochemical properties: nitrate is reduced (nitrite indication). Indole is synthesized.

From the above evaluation, the strain is assigned to the species Bacillus subtilis, with isolated deviations from the taxonomic standard (Bergey's Manual of Determinative Bacteriology).

Referring to the other hydroxylating microorganism families particularly suitable among the micrococcaceae are *Sarcina lutea* and *Micrococcus lysodeikticus*.

Among the pseudomonadaceae, *Protaminobacter alboflavus* and *Pseudomonas facilis* are preferred.

Among the corynebacteriaceae, *Corynebacterium hoagii* is especially preferred.

Among the enterobacteriaceae, *Escherichia coli* strains are particularly preferred.

When the substrate is ω-N-acyl-L-tryptophan, the acyl group is preferably aliphatic hydrocarbon carboxyl of one to five especially one to three carbon atoms, for example, acetyl, or aromatic hydrocarbon carboxyl such as benzoyl and toluoyl.

The microbiological hydroxylation is conducted in accordance with conventional methods. For example, there are usually first conducted preliminary experiments to ascertain the optimum fermentation conditions, including such parameters as the selection of the nutrient medium, the substrate solvent, the substrate concentration, the operating conditions — such as temperature, aeration, pH, agitation — and the optimum times for germination, addition of substrate, and substrate contact with the microorganism enzyme by means of analytical methods — particularly by means of thin-layer chromatography.

In this connection, it was found that the yield is increased by an addition of $Fe^{++}$ ions to the fermentation solution preferably in a concentration of 5 to 50 mg/liter, and that ascorbic acid preferably in a concentration of 40 to 80 mg/liter accelerates the microbiological conversion. It was furthermore observed that it is advantageous to add the substrate toward the end of the main growth period of the microorganism, for example, 8 to 15 hours after inoculation.

It is also to be noted that concentrations of about 80–250 mg of substrate per liter of nutrient medium result in the highest yields.

As further preferred conditions, the culture is incubated at 25°–40°C, the pH is adjusted to 6–8, and 1–5 liters of air per minute are added. The conversion of the substrate is suitably controlled by a thin-layer chromatographic analysis of sample extracts. After the fermentation has been terminated, the culture broth is freed of the bacterial cells by filtration or centrifugation.

The isolation of the product of the process is conducted conventionally. In accordance with a preferred method, the process product is adsorbed on a freshly regenerated cation exchanger in the $H^+$ form and then eluted by means of ammonia or an ammonium salt condition. For further purification, the concentrated eluate can then be chromatographed over dextran gels, for example.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

An Erlenmeyer flask containing 500 ml. of a sterilized aqueous medium, consisting of 0.1 percent peptone, 0.2 percent corn steep liquor, 0.5 percent D(+)–glucose, and 0.5 percent yeast extract (nutrient solution), adjusted to pH 8.0, is inoculated with 3 drops of supernatant broth of a tilted agar culture of Bacillus subtilis (ATCC 21733) and shaken for 24 hours at 30° C.

The thus-germinated inoculating cultures are centrifuged for 15 minutes at 6,000–8,000 g.'s, and respectively two cultures are suspended in 100 ml. of sterilized nutrient solution. The suspension is transferred into an inoculation flask containing 300 ml. of nutrient solution, as well as minor amounts of $FeSO_4 \cdot 7 H_2O$ and L-tryptophan.

By means of this bacterial suspension, 10 l. of sterilized nutrient solution, containing 325 mg. of tryptophan and 18.07 mg. of $FeSO_4 \cdot 7 H_2O$ and adjusted to pH 7.5, is inoculated and incubated for 24 hours at 30° C. at an aeration of 2 l./min. and an agitating speed of 220 r.p.m.

From this preliminary fermentation stage, 0.9 l. is transferred into a main fermentor charged with 15 l. of sterilized nutrient solution. During the main fermentation, the same technical conditions are employed as in the preliminary fermentation. The pH is adjusted to 6.8 Ten hours after inoculation, 3.3 g. of L-tryptophan and 495 mg. of $FeSO_4 \cdot 7 H_2O$, dissolved in 635 ml. of sterile water, are added thereto.

The progression of the microbiological conversion is determined by analysis of samples taken at intervals.

The substrate has been converted, except for trace amounts, 68.5 hours after the addition of the substrate.

The culture broth is freed of the bacillus cells by means of continuous centrifuging. The cell-free culture broth is mixed with 750 g. of freshly regenerated cation exchanger in the $H^+$ form and agitated for 45 minutes. Thereafter, the exchange resin is filtered off.

Respectively 20 g. of the exchange resin, stored in the cold state, is agitated several times with 25 ml. aliquots of 1-molar ammonium acetate solution for 10 minutes and then filtered. The combined eluates are lyophilized and then chromatographed in the form of an aqueous solution over a "Sephadex" column with 0.1-molar ammonium bicarbonate solution at 10° C.

After combining and lyophilizing the main fractions, 2.56 g. of 5-hydroxy-L-tryptophan is obtained, m.p. 268°–270° C. (under decomposition).

EXAMPLE 2

This example differs from Example 1 only in the manner of adding the substrate and in the addition of ascorbic acid to the substrate.

The substrate is added in the form of a sterile stock solution consisting of:

| | | |
|---|---|---|
| 46 | mg. | iron(II) sulfate |
| 1 | g. | ascorbic acid |
| 3.3 | g. | L-tryptophan |
| | | in 635 ml. of sterile water. |

The total amount is added as follows: one-half thereof upon inoculation of the main fermentor, and one-half after 10 hours of fermentation time.

|  | Concentration At Beginning of Fermentation | Concentration After 10 Hours of Fermentation |
| --- | --- | --- |
| Tryptophan | 0.1 g./l. | 0.2 g./l. |
| FeSO$_4$ | 5 · 10$^{-6}$ molar | 10$^{-5}$ molar |
| Ascorbate | 0.033 g./l. | 0.067 g./l. |

After a total fermentation period of 48 hours, i.e. 38 hours after the second addition of substrate, the culture medium contains 125 mg./l. of 5-hydroxy-L-tryptophan (58.1 percent of theory). The final yield after 66 hours of total fermentation time is 62.8 percent of theory.

EXAMPLE 3

This example differs from Example 1 merely in the concentration of the substrate.

Ten hours after inoculation of the main fermentor, a solution is added consisting of 1.65 g. of L-tryptophan and 46 mg. of iron(II) sulfate in 635 ml. of sterile water.

Measurements of the 5-hydroxy-L-tryptophan content after a total fermentation period of 50, 58, and 66 hours, respectively, indicate, in the same sequence, final yields of 100, 96, and 99.4 percent of theory.

EXAMPLE 4

In a 500 ml. Erlenmeyer flask, 100 ml. of a nutrient medium according to Example 1 is inoculated with 1 ml. of a cell suspension of Bacillus subtilis sp., obtained as a supernatant broth of a tilted agar culture with 4 ml. of sodium chloride solution.

Thereafter, the culture is shaken for 24 hours at 30° C. and then centrifuged at 6,000–8,000 g.'s for 15 minutes under sterile conditions. The cell sediment is again suspended in 100 ml. of isotonic salt solution, buffered to pH 6 with phosphate, and once more centrifuged. This washing step is repeated. After once again suspending the washed cells in 20 ml. of salt solution, buffered to pH 6, the culture is transferred into a 100 ml. Erlenmeyer flask, and 4 mg. of ω-N-acetyl-L-tryptophan (β-[indolyl-3]-α-acetylaminopropionic acid) is added thereto in the form of 0.26 ml. of a sterile-filtered stock solution, obtained by adjusting an aqueous suspension of 150 mg. of the compound to pH 4.5 (with 2N NaOH) and replenishing the solution to obtain 10 ml. After 48 hours of incubation at 30° C. under shaking, the cells are removed by centrifuging, and respectively 100 μl. of the overflow is applied directly to instant silica gel plates (Woelm) as a starting line of a width of 5 cm., for analysis by means of thin-layer chromatography.

TLC Evaluation:

In addition to the fermentation sample, respectively 5 μl. of 0.2 percent strength methanolic solutions of the following three reference substances were applied:
L-Tryptophan
ω-N-Acetyl-L-tryptophan, and
5-Hydroxy-L-tryptophan.

After an initial drying step, the chromatography was conducted for 2 hours by the ascending mode in an eluent system of acetone:chloroform:glacial acetic acid:water (volume ratio 40:40:20:5). Two chromatograms obtained in this way were evaluated by dyeing with various sprayable reagents, as follows:

Plate 1: Dyeing with the Udenfriend reagent (first spraying with a 0.1 percent ethanolic solution of 1-nitroso-2-naphthol, second spraying with a solution mixture of 0.2 ml. 25 percent sodium nitrite solution and 5 ml. of 2N hydrochloric acid), which is extensively specific for 5-hydroxyindole derivatives.

Plate 2: Spraying and subsequent heating with a 1 percent solution of p-dimethylaminobenzaldehyde in ethanol/concentrated HCl (1:1) = van Urk's reagent.

Results:

Plate 1 (specific coloring): The fermentation sample shows a single marked "Udenfriend-positive" zone having the color and R$_f$ value (0.15) of 5-hydroxy-L-tryptophan.

Plate 2 (unspecific coloring): The fermentation sample shows, in addition to the zone analogous to 5-HTP, pronounced proportions of L-tryptophan (R$_f$ = 0.24), as well as unreacted N-acetyl-L-tryptophan (R$_f$ = 0.75).

EXAMPLE 5

Analogously to Example 4, ω-N-benzoyl-L-tryptophan is converted into 5-hydroxy-L-tryptophan.

Characterization of 5-hydroxy-L-tryptophan, accessible by fermentation:
colorless crystals, m.p. 268°–270° C. (decomposition); g.'
rotation $[\alpha]_{546}^{20} = -37.4°$ (1 percent aqueous solution);
UV data of the aqueous solution;
maximum at 276.5 mμ
shoulder at 295 mμ
minimum at 248 mμ

EXAMPLE 6

A supernatant broth of a tilted agar culture (0.5 ml.) of Sarcina lutea (ATCC 9341) with 2 ml. of NaCl solution is added to 5 ml. of a nutrient medium in a centrifugal tube, sealed under sterile conditions. After 42 hours of shaking at 30° C., the cell material is centrifuged off at 5000 g's (10 minutes) and washed twice, each time by re-suspension in 5 ml. of phosphate-buffered salt solution (pH 6) and subsequent centrifuging, in order to remove any possibly interfering metabolites. The thus-washed sediment is suspended in 2 ml. of buffered salt solution (pH 6), containing 4 mg. (2 g./l.) of L-tryptophan. After 20, 40, and 43 hours of incubation under shaking at 30° C., the reaction mixture is centrifuged, and respectively 0.5 ml. of the supernatant liquor is withdrawn under sterile conditions and lyophilized. The lyophilized product of the sample withdrawn after 43 hours is mixed with 0.2 ml. of a 90 percent strength methanolic solution of 0.01N hydrochloric acid. The mixture is heated to 40° C., and the test sample is shaken for 2–3 minutes with the aid of a vibrating mixer. The overflow is applied in the form of a dot on the starting line of a Cellulose-F thin-layer plate (Merck) and chromatographed in the ascending mode against authentic 5-hydroxy-L-tryptophan as comparison, for 2½ hours. Eluent:acetone:chloroform:glacial acetic acid:water, 40:40:20:5 (volume ratio). Identification according to Udenfriend: The dry plate is thoroughly sprayed with a 0.1 percent solution of 1-nitroso-2-naphthol in 95 percent ethanol and dried briefly at room temperature. Thereafter, the plate is sprayed with a freshly prepared mixture of 0.2 ml. of 25 percent sodium nitrite solution and 5 ml. of 2N hydrochloric acid. Already during the second spraying step, the bacterial test solution develops a blue-purple color spot at an $R_f$ value of 0.06 – 0.07.

$R_f$ value of 5-hydroxy-L-tryptophan: 0.06.

EXAMPLE 7

Under the conditions set forth in Example 6, L-tryptophan is incubated with Micrococcus lysodeikticus (IFO 3333) in place of Sarcina lutea.

$R_f$ value of the bacterial synthesis product: 0.06-0.07.

$R_f$ value of 5-hydroxy-L-tryptophan: 0.05.

EXAMPLE 8

Under the conditions set forth in Example 6, L-tryptophan is incubated with Corynebacterium hoagii (ATCC 7005) instead of with Sarcina lutea.

$R_f$ value of the bacterial synthesis product: 0.06–0.08.

$R_f$ value of 5-hydroxy-L-tryptophan: 0.05.

EXAMPLE 9

Under the conditions set forth in Example 6, L-tryptophan is incubated with Protaminobacter alboflavus (ATCC 8458) in place of Sarcina lutea.

$R_f$ value of the bacterial synthesis product: 0.06–0.08.

$R_f$ value of 5-hydroxy-L-tryptophan: 0.05.

EXAMPLE 10

Under the conditions set forth in Example 6, L-tryptophan is incubated with Pseudomonas facilis (ATCC 11 228) instead of with Sarcina lutea.

$R_f$ value of the bacterial synthesis product: 0.07–0.08.

$R_f$ value of 5-hydroxy-L-tryptophan: 0.07.

EXAMPLE 11

Under the conditions set forth in Example 6, L-tryptophan is incubated with a strain of bacillus isolated by the inventors in place of Sarcina lutea.

$R_f$ value of the bacterial synthesis product: 0.05–0.06.

$R_f$ value of 5-hydroxy-L-tryptophan: 0.06.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of 5-hydroxy-L--ryptophan, comprising microbiologically hydroxylating a substrate selected from the group consisting of L-tryptophan, D,L-tryptophan and ω-N-acyl-L-tryptophan with Bacillus subtilis ATCC No. 21733.

2. A process as defined by claim 1, wherein the hydroxylation is conducted in a fermentation broth containing $Fe^{++}$ ion.

3. A process as defined by claim 2, wherein the hydroxylation is conducted in a fermentation broth containing ascorbic acid.

4. A process as defined by claim 1, wherein the hydroxylation is conducted in a fermentation broth containing ascorbic acid.

5. A process according to claim 1, wherein the substrate is added to a fermentation broth toward the end of the main growth period of the microorganism.

6. A process for the preparation of 5-hydroxy-L-tryptophan, comprising microbiologically hydroxylating a substrate selected from the group consisting of L-tryptophan, D,L-tryptophan and ω-N-acyl-L-tryptophan with a microorganism of the species Bacillus subtilis ATCC No. 21733, Sarcina lutea, Micrococcus lysodeikticus, Protaminobacter alboflavus, Pseudomonas facilis, Corynebacterium hoagii, or Escherichia coli, said hydroxylating being conducted in a fermentation broth containing a member selected from the group consisting of $Fe^{++}$ ion, ascorbic acid and mixtures thereof.

7. A process as defined by claim 6, wherein the hydroxylation is conducted in a fermentation broth containing $Fe^{++}$ ion.

8. A process as defined by claim 7, wherein the hydroxylation is conducted in a fermentation broth containing ascorbic acid.

9. A process as defined by claim 6, wherein the hydroxylation is conducted in a fermentation broth containing ascorbic acid.

10. A process according to claim 6, wherein the substrate is added to a fermentation broth toward the end of the main growth period of the microorganism.

11. A process for the preparation of 5-hydroxy-L-tryptophan, comprising microbiologically hydroxylating a substrate selected from the group consisting of L-tryptophan, D,L-tryptophan and ω-N-acyl-L-tryptophan with a microorganism of the species Bacillus subtilis ATCC No. 21733, *Sarcina lutea, Micrococcus lysodeikticus, Protaminobacter alboflavus, Pseudomonas facilis, Corynebacterium hoagii,* or *Escherichia coli,* said substrate being added to a fermentation broth toward the end of the main growth period.

* * * * *